(12) United States Patent
Nakagawa et al.

(10) Patent No.: US 8,216,406 B2
(45) Date of Patent: Jul. 10, 2012

(54) METHOD FOR MANUFACTURING THERMALLY EXPANDABLE BASE MATERIAL FOR VEHICLE INTERIOR AND METHOD FOR MANUFACTURING BASE MATERIAL FOR VEHICLE INTERIOR USING SAME

(75) Inventors: Yukihiro Nakagawa, Inuyama (JP); Noriaki Nakagawa, Inuyama (JP)

(73) Assignee: Nakagawa Sangyo Co., Ltd., Inuyama-Shi (JP)

( * ) Notice: Subject to any disclaimer, the term of this patent is extended or adjusted under 35 U.S.C. 154(b) by 0 days.

(21) Appl. No.: 13/180,529

(22) Filed: Jul. 11, 2011

(65) Prior Publication Data

US 2011/0265939 A1    Nov. 3, 2011

Related U.S. Application Data

(63) Continuation of application No. PCT/JP2010/063024, filed on Aug. 2, 2010.

(30) Foreign Application Priority Data

Aug. 7, 2009   (JP) .................................. 2009-184838

(51) Int. Cl.
*B29C 65/18*   (2006.01)
*D04H 1/48*    (2012.01)
*D04H 1/54*    (2012.01)
*B29C 44/38*   (2006.01)

(52) U.S. Cl. .......... 156/62.2; 156/79; 156/148; 156/276

(58) Field of Classification Search ................ 156/62.2, 156/79, 148, 276, 279
See application file for complete search history.

(56) References Cited

U.S. PATENT DOCUMENTS

| | | | |
|---|---|---|---|
| 5,258,089 A | * | 11/1993 | Tanaka et al. .............. 156/324.4 |
| 2008/0014413 A1 | * | 1/2008 | Tanabe et al. ................. 428/172 |
| 2010/0225017 A1 | * | 9/2010 | Nakagawa et al. .......... 264/45.8 |

FOREIGN PATENT DOCUMENTS

| | | |
|---|---|---|
| JP | 62-223356 | 10/1987 |
| JP | 63-035863 | 2/1988 |
| JP | 02-045135 | 2/1990 |
| JP | 2000-265854 | 9/2000 |
| JP | 2001-055671 | 2/2001 |
| JP | 2002-036969 | 2/2002 |
| JP | 2006-342437 | 12/2006 |
| JP | 2009-179894 | 8/2009 |
| JP | 2009-179895 | 8/2009 |
| JP | 2009-234232 | 10/2009 |
| WO | WO 2009/119033 A1 * | 10/2009 |

OTHER PUBLICATIONS

International Search Report for corresponding International Application No. PCT/JP2010/063024, Aug. 31, 2010.

* cited by examiner

*Primary Examiner* — Michael Tolin
(74) *Attorney, Agent, or Firm* — Dittavong Mori & Steiner, P.C.

(57) ABSTRACT

A method for producing a thermally expandable base material for a vehicle interior, the method includes needling a web to produce a fiber mat. The web includes an inorganic fiber, a thermoplastic resin fiber, and a thermally expandable microcapsule. The fiber mat is heated to a temperature at which the thermoplastic resin fiber is melt and which is lower than a thermal expansion starting temperature of the thermally expandable microcapsule. The fiber mat is hot-pressed. The fiber mat is cooled.

12 Claims, 5 Drawing Sheets

METHOD FOR MANUFACTURING THERMALLY EXPANDABLE BASE MATERIAL FOR VEHICLE INTERIOR AND METHOD FOR MANUFACTURING BASE MATERIAL FOR VEHICLE INTERIOR USING SAME

CROSS-REFERENCE TO RELATED APPLICATIONS

The present application is a continuation application of International Application No. PCT/JP2010/063024, filed Aug. 2, 2010, which claims priority to Japanese Patent Application No. 2009-184838, filed Aug. 7, 2009. The contents of these applications are incorporated herein by reference in their entirety.

BACKGROUND OF THE INVENTION

1. Field of the Invention

The present invention relates to a production method of a thermally expandable base material for a vehicle interior and a production method of a base material for a vehicle interior using the same.

2. Discussion of the Background

Conventionally, a base material for a vehicle interior material is used which is produced by depositing a mixture of an inorganic fiber and a resin fiber, needling the deposit to fabricate a mat, heating the mat at a temperature at which the resin fiber is melt, hot-pressing the mat, and then cold-pressing the mat to mold. The base material has good thermal dimensional stability, and thus the rate of the thermal dimensional change is low. For the purpose of obtaining a vehicle interior material having high rigidity, however, the base material must have a high basis weight, and thus cannot meet the recent demand for the reduction of vehicle weight.

In order to solve the above problem, proposed is a base material for vehicle interior in which a thermally expandable microcapsule is incorporated into a mat obtained depositing a mixture of an inorganic fiber and a resin fiber and/or resin powder. The weight of the base material can be readily reduced since the thermally expandable microcapsule is expanded during secondary molding. In addition, the secondary molded product has a sufficient thickness and high rigidity. Such base material may be produced by, for example, incorporating a thermoplastic resin binder and a foamable microsphere into a needled fiber felt which is composed mainly of a glass fiber while being dispersed, and then blowing (for example, in JP-A H02-45135). Additionally, a production method of an expanded article is known in which a reinforced fiber, a thermally expandable powder and the like are dispersed in a specific aqueous medium to prepare a bubble solution, and the bubble solution is subjected to forming into a web, the web is heated, compressed, and cooled to fabricate a stampable sheet, the stampable sheet is heated to expand the thermally expandable powder, molded, and then cooled (for example, in JP-A 2006-342437).

SUMMARY OF THE INVENTION

According to one aspect of the present invention, a method for producing a thermally expandable base material for a vehicle interior includes needling a web to produce a fiber mat. The web includes an inorganic fiber, a thermoplastic resin fiber, and a thermally expandable microcapsule. The fiber mat is heated to a temperature at which the thermoplastic resin fiber is melt and which is lower than a thermal expansion starting temperature of the thermally expandable microcapsule. The fiber mat is hot-pressed. The fiber mat is cooled.

According to another aspect of the present invention, a method for producing a base material for vehicle interior includes heating the thermally expandable base material for vehicle interior obtained by the above-mentioned method, to a temperature higher than the thermal expansion starting temperature of the thermally expandable microcapsule to thermally expand.

According to further aspect of the present invention, a method for producing a thermally expandable base material for a vehicle interior includes needling a web to produce a fiber mat. The web includes an inorganic fiber, a thermoplastic resin powder, and a thermally expandable microcapsule. The fiber mat is heated to a temperature at which the thermoplastic resin powder is melt and which is lower than a thermal expansion starting temperature of the thermally expandable microcapsule. The fiber mat is hot-pressed. The fiber mat is cooled.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described below with reference to FIGS. 1 to 5, wherein like reference numerals designate corresponding or identical elements throughout the various drawings.

[1] Thermally Expandable Base Material for Vehicle Interior

The method for producing a thermally expandable base material for vehicle interior of the one aspect of the embodiment of the present invention is characterized by needling a web including an inorganic fiber, a thermoplastic resin fiber, and a thermally expandable microcapsule to form a fiber mat, heating the fiber mat at a temperature at which the thermoplastic resin fiber is melt but which is lower than the thermal expansion starting temperature of the thermally expandable microcapsule, hot-pressing, and then cooling.

In addition, the method for producing a thermally expandable base material for vehicle interior of another aspect of the embodiment of the present invention is characterized by needling a web including an inorganic fiber, a thermoplastic resin powder, and a thermally expandable microcapsule to form a fiber mat, heating the fiber mat at a temperature at which the thermoplastic resin powder is melt but which is lower than the thermal expansion starting temperature of the thermally expandable microcapsule, hot-pressing, and then cooling.

(1) Method for Fabricating a Fiber Mat when Thermally Expandable Base Material for Vehicle Interior is Produced Using Thermoplastic Resin Fiber When a thermally expandable base material for vehicle interior is produced using an inorganic fiber, a thermoplastic resin fiber, and a thermally expandable microcapsule, apparatus and process for the production of a fiber mat are not particularly limited. The fiber mat may be produced using the following apparatus and process (see FIG. 1).

Figure 1:
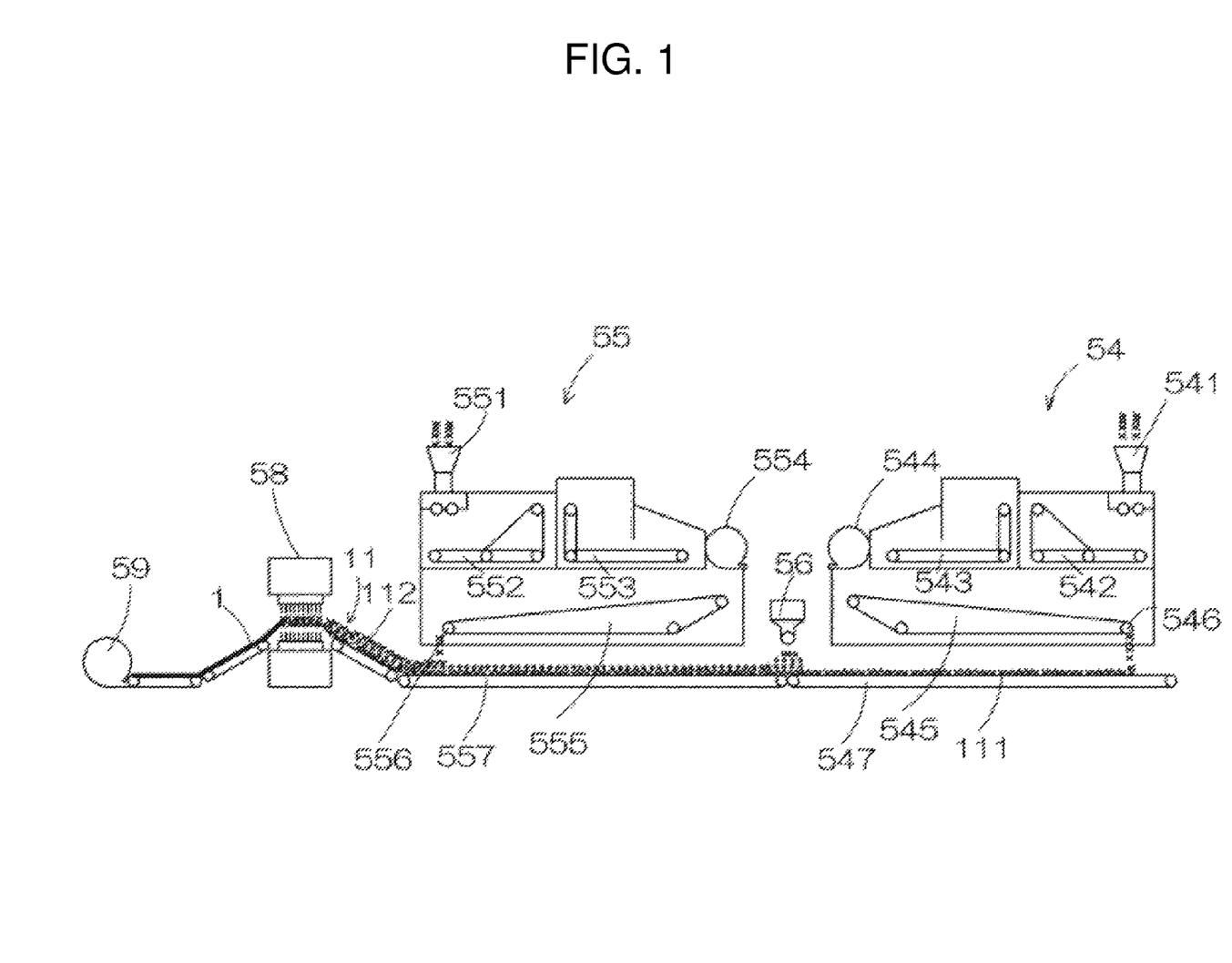
FIG. 1 schematically illustrates the apparatus and process for producing a fiber mat using a thermoplastic resin fiber.

Two web forming machines of a first web forming machine 54 and a second web forming machine 55 are juxtaposed. Mixed fiber of a fibrillated inorganic fiber and a fibrillated thermoplastic resin fiber are fed to a reserve box 541 in the web forming machine 54, and then conveyed while being unfolded by a spike lattice 542. Subsequently, the mixed fiber is conveyed using a feed roller 543, fed using a cylinder blower 544 onto a screw conveyor 545, and then deposited on a front conveyor 547 from a predetermined position, thereby forming a first web 111.

Next, a predetermined amount of the thermally expandable microcapsule is distributed using a capsule distributor 56 over the first web 111 which is formed on the front conveyor 547 while conveying the first web. After that, the first web 111 is conveyed using a front conveyor 557, and unfolded mixed fibers are fed in the same manner as above using the other web forming machine 55, which has the same structure as the above web forming machine, to a side having the thermally expandable microcapsule of the first web 111, thereby depositing the fibers to form a second web 112. In this manner, a web 11 composed of the first web 111, the second web 112, and the thermally expandable microcapsule distributed at the interface therebetween is obtained. Subsequently, the web 11 is subjected to needling using a needling machine 58 to fabricate a fiber mat 1 having a predetermined basis weight and thickness. The fiber mat 1 is then wound using a mat-winding roll 59, and stored.

(2) Method for Fabricating a Fiber Mat when Thermally Expandable Base Material for Vehicle Interior is Produced Using Thermoplastic Resin Powder When a thermally expandable base material for vehicle interior is produced using an inorganic fiber, a thermoplastic resin powder, and a thermally expandable microcapsule, apparatus and process for the production of a fiber mat are not particularly limited. The fiber mat may be produced using the following apparatus and process (see FIG. 2).

Figure 2:
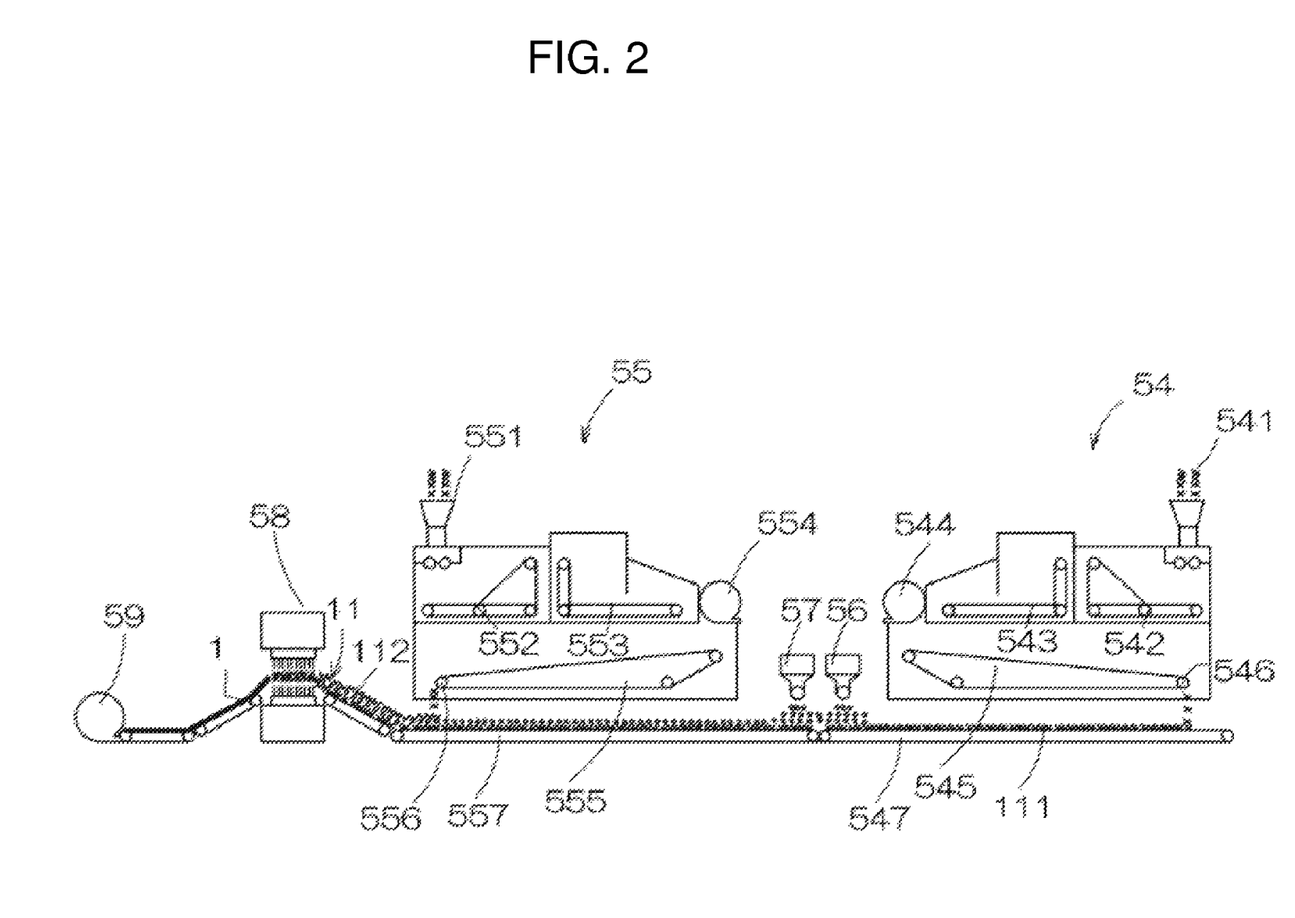
FIG. 2 schematically illustrates the apparatus and process for producing a fiber mat using a thermoplastic resin powder.

Two web forming machines of a first web forming machine 54 and a second web forming machine 55 are juxtaposed. Unfolding inorganic fibers are fed to a reserve box 541 in the web forming machine 54, and then conveyed while being further unfolded by a spike lattice 542. Subsequently, the mixed fiber is conveyed using a feed roller 543, fed using a cylinder blower 544 onto a screw conveyor 545, and then deposited on a front conveyor 547 from a predetermined position, thereby forming a first web 111.

Next, a predetermined amount of the thermally expandable microcapsule and a predetermined amount of the thermoplastic resin powder are respectively distributed using a capsule distributor 56 and a resin powder distributor 57 over the first web 111 which is formed on the front conveyor 547 while conveying the first web 111. After that, the first web 111 is conveyed using a front conveyor 557, and unfolded inorganic fibers are fed in the same manner as above using a second web forming machine 55, which has the same structure as the above web forming machine, to a side having the thermally expandable microcapsule and the thermoplastic resin powder of the first web 111, thereby depositing the fibers and forming a second web 112. In this manner, a web 11 composed of the first web 111, the second web 112, the thermally expandable microcapsule and thermoplastic resin powder distributed at the interface therebetween is obtained. Subsequently, the web 11 is subjected to needling using a needling machine 58 to fabricate a fiber mat 1 having a predetermined basis weight and thickness. The fiber mat 1 is then wound using a mat-winding roll 59, and stored.

In the fiber mat production methods (1) and (2), the thermally expandable microcapsule to be distributed over the first web is preferably subjected to static electricity removal in advance. The thermally expandable microcapsule is a minute sphere having a sheath made of a thermoplastic resin. If the microcapsule is distributed without static electricity removal, the microcapsule is charged to cause flocculation. Therefore, the microcapsule preferably is distributed after static electricity removal. The method for the static electricity removal is not particularly limited. For example, a capsule distributor can be used which is equipped with a container such as a hopper for placing the thermally expandable microcapsule, and a static electricity removing bar disposed immediately above the outlet port at the bottom of the container.

The thicknesses of the fiber mats fabricated by the methods (1) and (2) are not particularly limited. The thickness thereof is preferably in the range from 2 to 15 mm, and more preferably from 2 to 10 mm for the purpose of producing a vehicle interior material which is lightweight and highly rigid. The basis weight of the fiber mat is not particularly limited. The basis weight thereof is preferably in the range from 200 to 1,000 g/m$^2$, and more preferably from 200 to 800 g/m$^2$ for the purpose of producing a vehicle interior material which is lightweight and highly rigid. Additionally, the thickness and basis weight of the fiber mat are preferably in the range from 3 to 8 mm and in the range from 200 to 600 g/m$^2$, respectively, and particularly from 3 to 6 mm and from 200 to 400 g/m$^2$, respectively.

Figure 3:
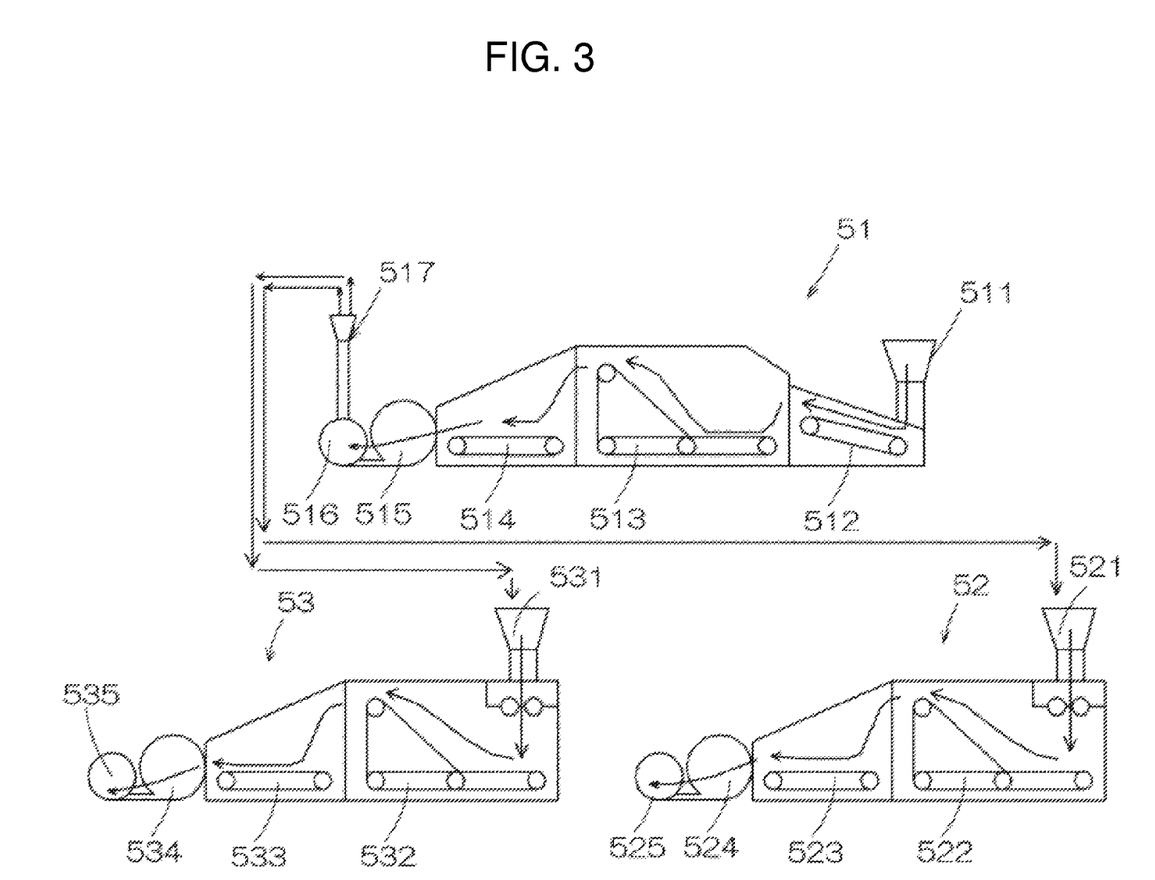
FIG. 3 schematically illustrates the apparatus and process used for unfolding mixed fibers or inorganic fibers fed to a web forming machine.

Moreover, apparatus and process for previously unfolding mixed fiber or inorganic fiber to be fed to the web forming machine are not particularly limited. The fibers may be unfolded using the following apparatus and process (see FIG. 3, the arrow in FIG. 3 shows the flow direction of the fiber).

Mixed fibers or inorganic fibers charged into a reserve box 511 of a first opener 51 are conveyed while being unfolded by a tube lattice 512, fed to a spike lattice 513, and conveyed while being further unfolded. Subsequently, the fibers are conveyed using a feed roller 514, and the unfolded mixed fibers or inorganic fibers are conveyed through air using a cylinder blower 515 and a fan 516. The feed track is switched using a switching damper 517, and the fibers are fed to the two juxtaposed second openers 52 and 53.

After that, the previously-unfolded mixed fibers or inorganic fibers are fed to reserve boxes 521 and 531 of the two second openers 52 and 53, respectively, and they are conveyed by spike lattices 522 and 532 while being further unfolded, and conveyed using feed rollers 523 and 533. Subsequently, the fibers are conveyed through air using cylinder blowers 524 and 534, and fans 525 and 535, and fed to reserve boxes 541 and 551 of the two web forming machines 54 and 55. It is preferable that the mixed fibers or inorganic fibers are fed to the two web forming machines 54 and 55 after unfolding them using the first opener 51 and the two second openers 52 and 53. Alternatively, one of the second openers 52 and 53 may be used alone, as long as the fibers are thoroughly unfolded (one of them is used alone). In particular, when an inorganic fiber is used alone without using thermoplastic resin fiber, more specifically, when a thermoplastic resin powder is used, the second openers 52 or 53 may be used alone.

(3) Production of Thermally Expandable Base Material for Vehicle Interior

The fiber mat 1 fabricated by the method (1) or (2) is normally heated during passing through a heating furnace. In this case, the temperature of the heating furnace is set to a higher temperature than the temperature at which the thermoplastic resin fiber or powder is melt. When the thermoplastic resin fiber or powder is melt in the heating furnace, a part of the inorganic fibers can be bound by the thermoplastic resin.

Figure 4:
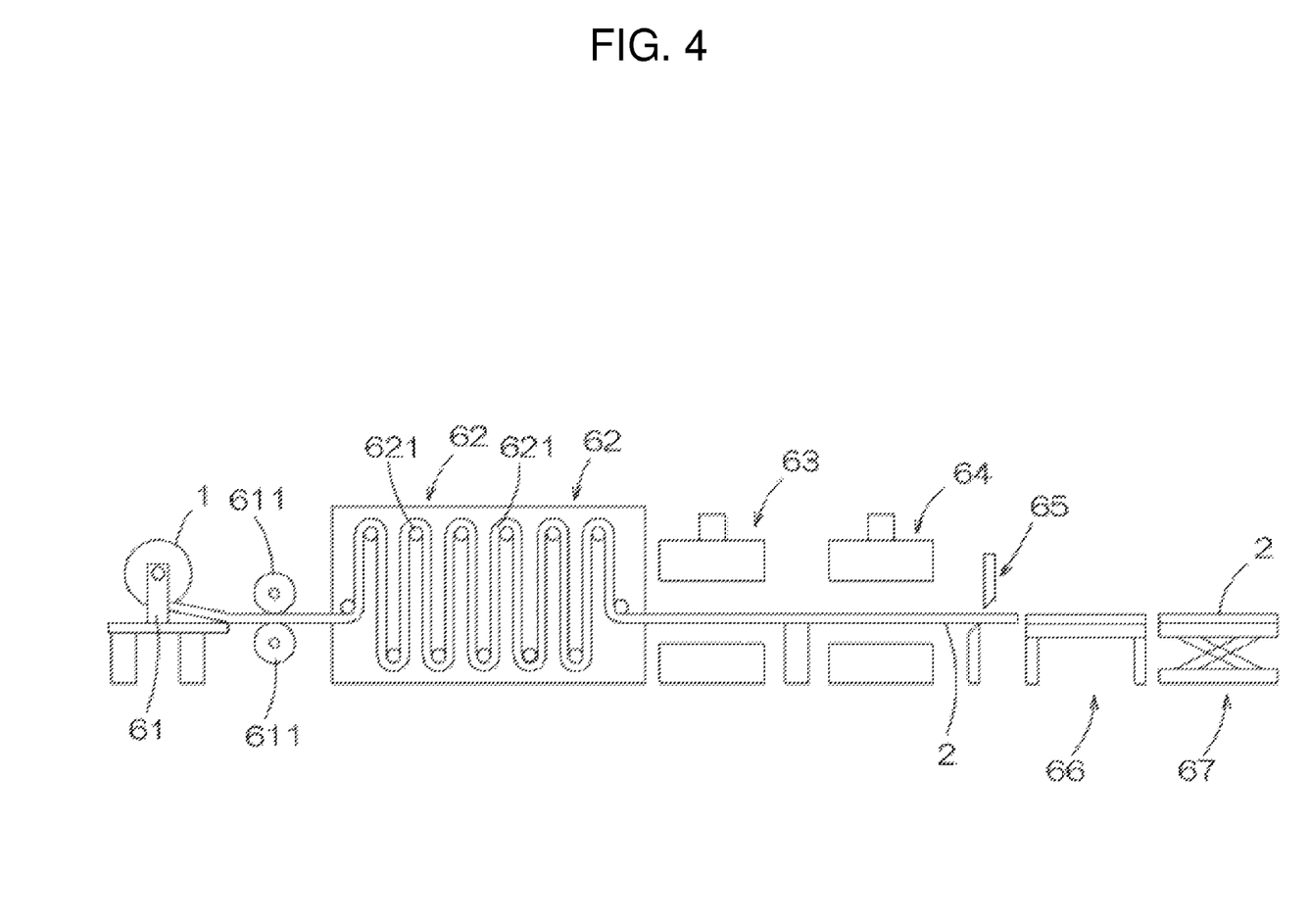
FIG. 4 schematically illustrates the apparatus and process for producing a thermally expandable base material for vehicle interior.

The heating means is not particularly limited and example thereof include a heating with hot air, a heater such as an infrared heater and a far-infrared heater, a high-frequency heating, and the like. The heating is preferably carried out using hot air. As shown in FIG. 4, when the fiber mat 1 is passed through an air-heating furnace 62, the thermoplastic resin fiber or powder can be more readily melt.

The temperature of the above-mentioned "heating" is lower than the thermal expansion starting temperature of the thermally expandable microcapsule. The heating is carried out preferably at a temperature ranging from a temperature lower than the thermal expansion starting temperature by 5° C., to a temperature lower than the thermal expansion starting temperature by 50° C., and more preferably at a temperature ranging from a temperature lower than the thermal expansion starting temperature by 5° C., to a temperature lower than the thermal expansion starting temperature by 30° C. Additionally, the heating temperature is higher than a temperature at which the thermoplastic resin fiber or powder is melt. A part of the inorganic fibers is bound by the melt thermoplastic resin fiber or powder, and the resultant fiber mat can be reinforced from the inside. Handling of the thermally expandable base material for vehicle interior during subsequent thermoforming is facilitated. In this case, the heating is carried out preferably at a temperature ranging from a temperature higher than the temperature at which the thermoplastic resin fiber or powder is melt by 5° C., to a temperature ranging from a temperature higher than the temperature at which the thermoplastic resin fiber or powder is melt by 20° C., and more preferably at a temperature ranging from a temperature higher than the temperature at which the thermoplastic resin fiber or powder is melt by 8° C., to a temperature ranging from a temperature higher than the temperature at which the thermoplastic resin fiber or powder is melt by 17° C. In addition, the heating time is not particularly limited and may be in the range from 1 to 10 minutes, and is preferably from 2 to 7 minutes, depending on the heating temperature.

After passing the fiber mat through a heating furnace such as the air-heating furnace 62, the fiber mat is subjected to hot-pressing using a hot-pressing machine 63 at a temperature at which the thermoplastic resin fiber or powder is melt but which the thermally expandable microcapsule does not cause thermal expansion, and then cooled using a cold-pressing machine 64 to produce a thermally expandable base material 2 for vehicle interior. The above-mentioned "hot-pressing" is normally conducted by thermal compression molding. The hot-pressing is carried out preferably at a temperature ranging from a temperature higher than the temperature at which the thermoplastic resin fiber or powder is melt by 5° C., to a temperature ranging from a temperature higher than the temperature at which the thermoplastic resin fiber or powder is melt by 50° C., more preferably at a temperature ranging from a temperature higher than the temperature at which the thermoplastic resin fiber or powder is melt by 5° C., to a temperature ranging from a temperature higher than the temperature at which the thermoplastic resin fiber or powder is melt by 30° C., and particularly at a temperature ranging from a temperature higher than the temperature at which the thermoplastic resin fiber or powder is melt by 5° C., to a temperature ranging from a temperature higher than the temperature at which the thermoplastic resin fiber or powder is melt by 20° C., and moreover, preferably at a temperature ranging from the thermal expansion starting temperature of the thermally expandable microcapsule, to a temperature lower than the thermal expansion starting temperature of the thermally expandable microcapsule by 50° C., more preferably at a temperature ranging from the thermal expansion starting temperature of the thermally expandable microcapsule, to a temperature lower than the thermal expansion starting temperature of the thermally expandable microcapsule by 30° C., and particularly at a temperature ranging from the thermal expansion starting temperature of the thermally expandable microcapsule, to a temperature lower than the thermal expansion starting temperature of the thermally expandable microcapsule by 20° C.

The above-mentioned "cooling" is carried out normally by cold-pressing using a compression molding machine or the like in order to obtain a thermally expandable base material for vehicle interior having a specified thickness and overall uniformity. When the cold-pressing is performed, the pressing plates may be at room temperature (for example, from 20° C. to 35° C.), or rapidly cooled by passing a refrigerant such as water therethrough. The thermally expandable base material 2 for vehicle interior thus produced is cut using a cutter 65 to a specified size according to the type of the vehicle interior material, and then stored. The cut pieces of the thermally expandable base material 2 for vehicle interior are weighed using a weighing machine 66, and stacked on a base material table 67. A specified number of the pieces are packaged and stored as necessary, and fed to the process of producing a base material for vehicle interior.

The thickness and basis weight of the thermally expandable base material for vehicle interior are not particularly limited and are preferably selected according to the type and the like of the vehicle interior material to be produced using the base material. The thickness thereof is preferably in the range from 0.5 to 8 mm, and particularly from 1 to 6 mm for the purpose of producing a vehicle interior material which is lightweight and highly rigid. The basis weight thereof is preferably in the range from 300 to 1,200 g/m², and particularly preferably from 300 to 1,000 g/m². Additionally, the thickness and basis weight of the thermally expandable base material for vehicle interior are preferably in the range from 1 to 4 mm and in the range from 300 to 700 g/m², respectively, and particularly from 1 to 3 mm and from 300 to 500 g/m², respectively.

The one aspect of the embodiment of the present invention for the production method of the thermally expandable base material for vehicle interior includes: (1) a process for mixing and unfolding of an inorganic fiber and a thermoplastic resin fiber; (2) a process for forming a first web; (3) a process for distributing a thermally expandable microcapsule over the first web; (4) a process for laminating a second web to the first web to form a web; (5) a process for fabricating a fiber mat by needling; (6) a process for heating; (7) a process for hot-pressing; and (8) a process for cooling. Additionally, another aspect of the embodiment of the present invention for the production method of the thermally expandable base material for vehicle interior includes: (1) a process for unfolding an inorganic fiber; (2) a process for forming a first web; (3) a process for distributing a thermoplastic resin powder and a thermally expandable microcapsule over the first web; (4) a process for laminating a second web to the first web to form a web; (5) a process for fabricating a fiber mat by needling; (6) a process for heating; (7) a process for hot-pressing; and (8) a process for cooling. In these producing methods, all the processes are normally continuous, whereby a uniform thermally expandable base material for a vehicle interior material can be efficiently produced.

(4) Inorganic Fiber, Thermoplastic Resin Fiber or Powder, and Thermally Expandable Microcapsule (a) Inorganic Fiber The above-mentioned "inorganic fiber" is a material forming a base of the thermally expandable base material for vehicle interior, and has excellent flame retardancy, insulation properties, and the like. The inorganic fiber is not particularly limited and may be selected from various inorganic fibers. Examples of the inorganic fiber include a glass fiber, a carbon fiber, a basalt fiber, and the like. The inorganic fibers may be used singly or in combination of two or more types thereof. Among these inorganic fibers, a glass fiber is preferred because it is readily available and cost-effective. When a glass fiber is used, the amount thereof to be used is preferably 80% or more by mass, and particularly 90% or more by mass, taking the total amount of the inorganic fiber as 100% by mass. The inorganic fiber may be wholly a glass fiber.

(b) Thermoplastic Resin Fiber

The above-mentioned "thermoplastic resin fiber" is not particularly limited and may be selected from fibers made of various thermoplastic resins. Examples of the thermoplastic resin include a polyolefin resin such as polyethylene, polypropylene, and a copolymer of ethylene and propylene; a polyester resin such as polyethylene terephthalate, and polybutylene terephthalate; a polystyrene-based resin such as polystyrene, a copolymeric resin of acrylonitrile and styrene, and a copolymeric resin of acrylonitrile, styrene and butadiene; an acrylic resin such as poly methyl methacrylate; a polyamide resin; a polycarbonate resin; a polyacetal resin; and the like. Two or more types of thermoplastic resins may be used in combination as long as they can be spun together into a thread, but only one resin is often used.

The thermoplastic resin fiber is preferably a polyolefin resin fiber and a polyester resin fiber. Among these, a polyolefin resin fiber is more preferable.

The polyolefin resin constituting the polyolefin resin fiber may be an unmodified or modified polyolefin resin. When an unmodified polyolefin resin is used, a propylene homopolymer, and a propylene-based copolymer such as an ethylene propylene random copolymer, and an ethylene propylene block copolymer are preferable. The preferable is a copolymer composed of propylene, and ethylene and/or an α-olefin having 4 to 20 carbon atoms such as 1-butene, 1-hexene, 1-octene and 4-methyl-pentene-1. A propylene homopolymer is more preferable as a propylene-based polymer. Additionally, when a modified polyolefin resin is used, an acid-modified polyolefin resin may be used which is modified with an acid such as a carboxylic acid and acid anhydride. The unmodified and modified resins may be used in combination.

The average fiber length and average fiber diameter of the thermoplastic resin fiber are not particularly limited. The average fiber length is preferably 200 mm or shorter (normally 20 mm or longer). When the thermoplastic resin fiber having an average fiber length of 200 mm or shorter is used, a uniform web containing the thermoplastic resin fiber, inorganic fiber, and thermally expandable microcapsule can be readily formed. Additionally, the average fiber diameter is preferably 50 μm or shorter (normally 10 μm or longer).

The thermoplastic resin fiber may be composed of only a thermoplastic resin, but is more preferably composed of a thermoplastic resin containing additives such as an antioxidant, a plasticizer, an antistatic agent, a flame retardant, an antibacterial agent, a mildewproofing agent and a coloring agent.

(c) Thermoplastic Resin Powder

Examples of the above-mentioned "thermoplastic resin powder" include various thermoplastic resin powders. Among them, a polyolefin resin powder is preferred. The polyolefin resin powder may be a powder composed of various polyolefin resin such as (1) a high density polyethylene and low density polyethylene; (2) a linear low density polyethylene, and a copolymer of ethylene and other monomer, such as a copolymer of ethylene and propylene, and a copolymer of ethylene and vinyl acetate; (3) a polypropylene; and the like. Among these, a polypropylene powder and high density polyethylene powder are preferred. The thermoplastic resin powders may be used singly or in combination of two or more types thereof, but only one type of resin powder is often used.

The average particle size of the thermoplastic resin powder is not particularly limited and is preferably in the range from 10 to 200 μm, more preferably from 20 to 150 μm, and particularly from 30 to 100 μm. When the average particle size of the thermoplastic resin powder is from 10 to 200 μm, the powder sufficiently binds the inorganic fibers, and the resultant fiber mat can be reinforced from the inside. The average particle size of the thermoplastic resin powder can be measured by microscopy, optical transmission particle size measurement, or the like.

(d) Thermally Expandable Microcapsule

The above-mentioned "thermally expandable microcapsule" normally contain a volatile hydrocarbon such as butane and isobutane, and the sheath is consisting of a copolymer of vinylidene chloride and acrylonitrile, a polyvinyl chloride, a poly(vinylidene chloride), or polyacrylonitrile. In the present invention, the contained thermally expandable microcapsule is not particularly limited. The hydrocarbon contained in the thermally expandable microcapsule and the material of the sheath may be selected from the exemplified various hydrocarbons above, and the material constituting the sheath, respectively. The thermally expandable microcapsule may have other hydrocarbons and a sheath consisting of other polymers.

The thermally expandable microcapsule is almost spherical having a diameter of 10 to 100 μm in general, and 20 to 80 μm in particular. When the thermally expandable microcapsule is heated at a temperature higher than the thermal expansion starting temperature, the capsule volumetrically expands 4 to 30 times. The diameter after volumetric expansion depends on the diameter before volumetric expansion and expansion magnification. The diameter after volumetric expansion will be, for example, in the range from 40 to 600 μm, and particularly from 60 to 400 μm. The thermally expandable microcapsule in the embodiment of the present invention is preferably one before volumetric expansion, which has a diameter of 10 to 100 μm, and particularly 20 to 80 μm, and volumetrically expands 4 to 27 times, preferably 8 to 27 times, and particularly 18 to 27 times, and one after volumetric expansion which has a diameter of, for example, 40 to 300 μm, and particularly 80 to 240 μm. Such thermally expandable microcapsule leads to a thermally expandable base material for vehicle interior allowing the production of a vehicle interior material which is lightweight, sufficiently sound absorbable, and highly rigid.

The content ratio of the inorganic fiber, thermoplastic resin fiber or powder, and thermally expandable microcapsule is not particularly limited. When the total of the inorganic fiber and thermoplastic resin fiber or powder is 100% by mass, the contents of the inorganic fiber, thermoplastic resin fiber or powder, and thermally expandable microcapsule are, respectively, preferably in the range from 20% to 80% by mass, from 20% to 80% by mass, and from 5% to 20% by mass, particularly from 35% to 65% by mass, from 35% to 65% by mass, and from 8% to 15% by mass. Such ratio leads to a thermally expandable base material for vehicle interior allowing the production of a vehicle interior material which has sufficiently rigidity and flame retardancy.

The content ratio of the thermoplastic resin fiber or powder, and thermally expandable microcapsule is not particularly limited. When the total of the thermoplastic resin fiber or powder and thermally expandable microcapsules 100% by mass, the contents of the thermoplastic resin fiber or powder and thermally expandable microcapsule are, respectively, preferably in the range from 70% to 90% by mass and from 10% to 30% by mass, and particularly from 75% to 85% by mass and from 15% to 25% by mass. Such ratio leads to a thermally expandable base material for vehicle interior allowing the production of a vehicle interior material which is lightweight and sufficiently rigid.

The content ratio of the inorganic fiber, and thermoplastic resin fiber or powder is not particularly limited. When the total of the inorganic fiber and thermoplastic resin fiber or powder is 100% by mass, the contents of the inorganic fiber and thermoplastic resin fiber or powder are, respectively, preferably in the range from 30% to 70% by mass and from 30% to 70% by mass, and particularly from 40% to 60% by mass and from 40% to 60% by mass. Such ratio leads to a thermally expandable base material for vehicle interior allowing the production of a vehicle interior material which has sufficiently rigidity and flame retardancy.

(e) Other Components

The fiber mat may contain other components besides the inorganic fiber, thermoplastic resin fiber or powder, and thermally expandable microcapsule. For example, a resin-based adhesive fiber or powder may be contained. The resin-based adhesive fiber or powder is not particularly limited, as long as the inorganic fiber and the thermally expanded microcapsule are bound when the thermally expandable microcapsule is thermally expanded and the thermally expandable base material for vehicle interior is thermally expanded. Examples of the resin-based adhesive fiber or powder include a fiber or powder of: (1) an acrylic resin such as a copolymer of ethylene and methyl methacrylate, a copolymer of ethylene and ethyl acrylate, and a copolymer of ethylene and acrylic acid; (2) a urethane-based resin; and (3) a vinyl acetate-based resin. Among the resin-based adhesive fiber or powder, a fiber or powder of an acrylic resin is preferable. The more preferable are a fiber or powder of an ethylene methyl methacrylate copolymer, and a fiber or powder of an ethylene ethyl acrylate copolymer.

The average fiber length and average fiber diameter of the resin-based adhesive fiber may be the same as the average fiber length and average fiber diameter of the above-mentioned thermoplastic resin fiber. The average particle size of the resin-based adhesive powder is not particularly limited and is preferably in the range from 0.05 to 0.7 μm, more preferably from 0.05 to 0.4 μm, and particularly from 0.05 to 0.2 μm. When the average fiber length and average fiber diameter of the resin-based adhesive fiber are within the specified range, or the average particle size of the resin adhesive powder is in the range from 0.05 to 0.7 μm, the resin-based adhesive fiber and resin adhesive powder have good dispersibility, and the powder uniformly penetrates into the fiber mat to lead to a thermally expandable base material for vehicle interior having higher uniformity.

When the fiber mat contains a resin-based adhesive fiber or powder, the content ratio thereof is not particularly limited. The contents of the thermoplastic resin fiber or powder, thermally expandable microcapsule, and resin-based adhesive fiber or powder are, respectively, preferably in the range from 65% to 85% by mass, from 5% to 18% by mass, and from 6% to 22% by mass, and particularly from 70% to 80% by mass, from 8% to 15% by mass, and from 10% to 18% by mass, based on 100% by mass of the total of the thermoplastic resin fiber or powder, thermally expandable microcapsule, and resin-based adhesive fiber or powder. Such ratio leads to a thermally expandable base material for vehicle interior allowing the production of a vehicle interior material which is lightweight and sufficiently rigid.

Additionally, a flame retardant is preferably contained in at least one of the thermoplastic resin fiber, thermoplastic resin powder, resin-based adhesive fiber, and resin-based adhesive powder. The flame retardant is not particularly limited. Example thereof includes a nitrogen-containing compound such as urea and melamine cyanurate; a phosphate compound such as polyphosphoric acid; an organic halogen compound such as a chlorinated paraffin and decabromobiphenyl ether; a hydrated metal oxide such as aluminum hydroxide and magnesium hydroxide; and the like. Among these flame retardants, a nitrogen-containing compound and a phosphate compound are preferred, because they will not generate a hazardous gas during burning, and the amount added in the resin is smaller than that of a hydrated metal compound. The flame retardant is more preferably a melamine cyanurate as the nitrogen-containing compound, a polyphosphoric acid as the phosphate compound, and is particularly a polyphosphoric acid-nitrogen-containing compound such as melamine polyphosphate and guanidine polyphosphate. These flame retardants may be used singly or in combination of two or more types thereof.

The content of the flame retardant is not particularly limited and is preferably selected as appropriate according to the type of the flame retardant. When the flame retardant is, for example, a nitrogen-containing compound or a phosphate compound, sufficient flame retardancy is achieved with a low dose. On the other hand, when the flame retardant is a hydrated metal oxide, a high dose is necessary. If the content of the flame retardant is too little, the vehicle interior material will not be obtained having sufficient flame retardancy. On the other hand, if the content thereof is too much, the flame retardant may be bled out. Therefore, it is preferred that the flame retardant be contained in two or more of the thermoplastic resin fiber and other components. As a result of this, the fiber mat has sufficient flame retardancy and will not cause bleeding out of the flame retardant, and thus the deterioration of the high flame retardancy inherent in the inorganic fiber is sufficiently prevented.

[2] Base Material for Vehicle Interior

The method for producing a base material for vehicle interior of the embodiment of the present invention is characterized by heating the thermally expandable base material for vehicle interior obtained by the one aspect of the present method or another aspect of the present method, at a temperature higher than the thermal expansion starting temperature of the thermally expandable microcapsule to thermally expand.

The apparatus and process for the production of the base material for vehicle interior are not particularly limited. The base material for vehicle interior may be produced using the following apparatus and process (see FIG. 5).

Figure 5:
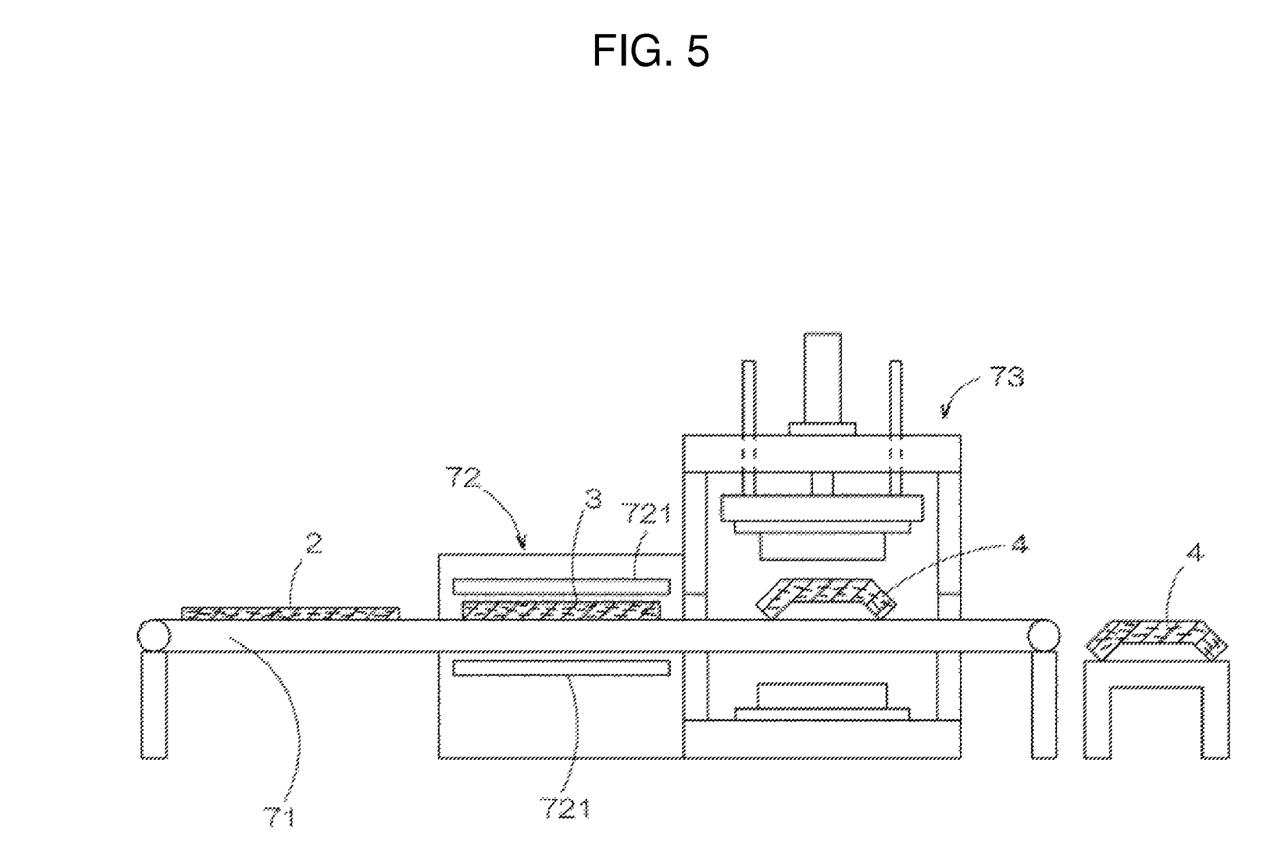
FIG. 5 schematically illustrates the apparatus and process for producing a base material for vehicle interior and a vehicle interior material.

A thermally expandable base material 2 for vehicle interior, which is cut into a specified size, is mounted on a belt conveyor 71, and then accommodated in a heating chamber 72 heated at a temperature higher than the thermal expansion starting temperature of the thermally expandable microcapsule, thereby thermally expanding the thermally expandable microcapsule to produce a base material 3 for vehicle interior.

The above-mentioned "heating" is normally carried out in the heating chamber 72 heated at a specified temperature, or by hot-pressing using a compression molding machine or the like. The heating is preferably carried out, preferably at a temperature ranging from a temperature higher than the thermal expansion starting temperature of the thermally expandable microcapsule by 5° C., to a temperature higher than the thermal expansion starting temperature of the thermally expandable microcapsule by 50° C., more preferably at a temperature ranging from a temperature higher than the thermal expansion starting temperature of the thermally expandable microcapsule by 8° C., to a temperature higher than the thermal expansion starting temperature of the thermally expandable microcapsule by 35° C., and particularly at a temperature ranging from a temperature higher than the thermal expansion starting temperature of the thermally expandable microcapsule by 12° C., to a temperature higher than the thermal expansion starting temperature of the thermally expandable microcapsule by 25° C. As a result of this condition, the thermally expandable microcapsule is sufficiently expanded, and a base material 3 for vehicle interior allowing the production of a vehicle interior material which is lightweight and highly rigid can be readily produced.

The thickness and basis weight of the base material for vehicle interior are not particularly limited and are preferably selected according to the type and the like of the vehicle interior material to be produced using the base material. The thickness thereof is preferably in the range from 3 to 18 mm, and particularly from 3 to 15 mm for the purpose of producing a vehicle interior material which is lightweight and highly rigid. The basis weight thereof is preferably in the range from 300 to 1,200 g/m$^2$, and particularly preferably from 300 to 1,000 g/m$^2$. Additionally, the thickness and basis weight of the thermally expandable base material for vehicle interior are preferably in the range from 5 to 12 mm and in the range from 300 to 700 g/m$^2$, respectively, and particularly from 6 to 10 mm and from 300 to 500 g/m$^2$, respectively.

The base material 3 for vehicle interior produced as described above is normally set between the plates of a compression molding machine 73 while the base material is kept at a temperature which allows compression molding, and formed into a vehicle interior material 4 having a specified shape. The compression molding is carried out by cold-pressing. The plates of the compression molding machine 73 may be at ambient temperature, or may be as necessary forcedly cooled by passing water through the plates. The vehicle interior material 4 is preferably produced using the apparatus shown in FIG. 5, wherein the thermally expandable base material 2 for vehicle interior and the base material 3 for vehicle interior are continuously transferred using a belt conveyor 71 to the heating chamber 72 and compression molding machine 73, respectively. The base material 3 for vehicle interior and vehicle interior material 4 are particularly continuously produced using the integral apparatus as shown in FIG. 5.

EXAMPLES

Hereinafter, the present invention will be specifically described using Examples.

Example 1

Production of Thermally Expandable Base Material for Vehicle Interior Using Thermoplastic Resin Fiber (1) Fabrication of Fiber Mat A glass fiber wound in the form of a continuous roving was cut into pieces of a specified length, and 50% by mass of the glass fiber pieces and 50% by mass of polypropylene resin fibers (the total of them was taken as 100% by mass) were fed to a hopper 511 of a first opener 51, unfolded therein, and fed from a switching damper 517 to a reserve box 521 of the first opener 52 and a reserve box 531 of a second opener 53. They were unfolded again (see FIG. 3), fed to the reserve box 541 of a first web forming machine 54 and a reserve box 551 of a second web forming machine 55, respectively, and further unfolded therein (see FIG. 1).

After that, the mixed fibers further unfolded in the first web forming machine 54 were fed onto a screw conveyor 545 using a cylinder blower 544, conveyed using the conveyor, and fed onto the front conveyor 547 from a gauge roller 546 at the edge of the conveyor to deposit, thereby forming a first web 111. Subsequently, a thermally expandable microcapsule was distributed using a capsule distributor 56 over the first web 111. The distributed amount of the thermally expandable microcapsule was 10% by mass based on 100% by mass of the total of the glass fiber, polypropylene resin fiber, and thermally expandable microcapsule contained in the fiber mat. And then, the first web including the capsule was conveyed using a front conveyor 557. Subsequently, the mixed fibers further unfolded in the second web forming machine 55 were fed onto a screw conveyor 555 using a cylinder blower 554, conveyed using the conveyor, and fed onto the front conveyor 557 from a gauge roller 556 at the edge of the conveyor to deposit on a side having the thermally expandable microcapsule of the first web 111 and form a second web 112. In this manner, a web 11 composed of the first web 111, second web 112, and thermally expandable microcapsule distributed at the interface therebetween was produced. After that, the web 11 was needled using a needling machine 58 to fabricate a fiber mat 1, and the fiber mat was cut into pieces of a specified width and wound using the mat-winding roll 59 (see FIG. 1). The basis weight of the fiber mat 1 was 350 g/m$^2$, and the thickness was 5 mm.

(2) Thermally Expandable Base Material for Vehicle Interior

The fiber mat 1 wound using a winder 61 after the production in the above (1) was fed into a air-heating furnace 62 heated at a temperature of 170° C. which was higher than the melting temperature of the polypropylene resin fiber (160° C.) by 10° C. and conveyed in the furnace over a period of 3 minutes to melt the polypropylene resin fiber. After that, the fiber mat was heated and compressed using a hot-pressing machine 63 in which hot plates were heated at a temperature of 170° C. that was lower than the thermal expansion starting temperature of the thermally expandable microcapsule by 10° C., under a pressure of 15 MPa for 3 seconds. The fiber mat was then cooled using a cold-pressing machine 64 in which a clearance was 2 mm between the cooling plates that were cooled to a temperature of 20° C. by passing water through the inside of the cooling plates, thereby producing a thermally expandable base material 2 for vehicle interior having a thickness of 1.8 mm. Subsequently, the thermally expandable base material was cut using a cutter 65 into pieces of a specified length, and the pieces were weighed using a weighing machine 66 and mounted on a base material table 67 (see FIG. 4).

Example 2

Production of Thermally Expandable Base Material for Vehicle Interior Using Thermoplastic Resin Powder A glass fiber used in Example 1 was fed to a hopper 511 of a first opener 51, unfolded therein, and fed from a switching damper 517 to a reserve box 521 of the first opener 52 and a reserve box 531 of a second opener 53. They were unfolded again (see FIG. 3), fed to the reserve box 541 of a first web forming machine 54 and a reserve box 551 of a second web forming machine 55, respectively, and further unfolded therein. Then, a first web 111 was formed in the same manner as that in Example 1. Subsequently, a thermally expandable microcapsule was distributed using a capsule distributor 56 over the first web 111. Additionally, a polypropylene resin powder was distributed using a resin powder distributor 57 over the first web 111. The mass ratio of the glass fiber to the polypropylene resin powder was the same as the mass ratio of the glass fiber to the polypropylene resin fiber in Example 1, and the mass ratio of the thermally expandable microcapsule to the total amount was the same as that in Example 1.

The first web 111 having the thermally expandable microcapsule and thermoplastic resin powder was conveyed using a front conveyor 557. After that, a second web 112 was formed on the first web 111 on a side having the thermally expandable microcapsule and polypropylene resin powder, in the same manner as in Example 1. In this manner, the web 11 composed of the first web 111, second web 112, and thermally expandable microcapsule and polypropylene resin powder that were distributed at the interface between these webs was produced. After that, a fiber mat 1 was fabricated by needling in the same manner as that in Example 1, and the fiber mat was cut into pieces of a specified width and wound using the mat-winding roll 59 (see FIG. 2). The basis weight of the fiber mat 1 was 350 g/m$^2$, and the thickness was 5 mm. Subsequently, a thermally expandable base material 2 for vehicle interior having a thickness of 1.8 mm was produced in the same manner as those in the method (2) in Example 1. The thermally expandable base material was then cut using a cutter 65 into pieces of a specified length, and the pieces were weighed using a weighing machine 66 and mounted on a base material table 67 (see FIG. 4).

Example 3

Production of Base Material for Vehicle Interior

The thermally expandable base material 2 for vehicle interior cut into pieces of a specified length after the production by Example 1 was allowed to stand in a heating chamber 72 heated at a temperature of 230° C. for 90 seconds. The thermally expandable base material 2 for vehicle interior was heated so as to have a surface temperature of 195° C. higher than the thermal expansion starting temperature of the thermally expandable microcapsule by 17° C. to thermally expand the thermally expandable microcapsule and produce a base material 3 for vehicle interior. After that, the base material 3 was molded while being cooled using a compression molding machine 73 in which a clearance was 8 mm between the cooling plates that were cooled to a temperature of 18° C. by passing water through the inside of the cooling plates, thereby producing a vehicle interior material 4 having a thickness of 8 mm (see FIG. 5).

According to the one aspect of the embodiment of the present invention for the production method of a thermally expandable base material for vehicle interior in which a fiber mat is fabricated under dry conditions, using an inorganic fiber, a thermoplastic resin fiber and a thermally expandable microcapsule, and to the another aspect of the embodiment of the present invention for the production method of a thermally expandable base material for vehicle interior in which a fiber mat is fabricated under dry conditions, using an inorganic fiber, a thermoplastic resin powder and a thermally expandable microcapsule, when a fiber mat obtained by methods in which all the processes in the methods are carried out under dry conditions and a medium such as water is not used, is subjected to simple operations or processes including heating, hot-pressing and cooling, a thermally expandable base material for vehicle interior allowing the production of a vehicle interior material which is lightweight, sufficiently sound absorbable and highly rigid can be readily produced at a low cost.

Additionally, in the case where the web is fabricated by forming a first web including the inorganic fiber and the thermoplastic resin fiber, distributing the thermally expandable microcapsule over the first web, and then laminating a second web including the inorganic fiber and the thermoplastic resin fiber to the first web on a side having the thermally expandable capsule, and in the case where the web is fabricated by forming a first web including the inorganic fiber, distributing the thermoplastic resin powder and the thermally expandable microcapsule over the first web, and then laminating a second web including the inorganic fiber to the first web on a side having the thermoplastic resin powder and the thermally expandable capsule, the thermally expandable microcapsule, or the thermoplastic resin powder and thermally expandable microcapsule, distributed between the first and second webs are uniformly dispersed all over the fiber mat by needling, and a thermally expandable base material for vehicle interior allowing the production of a highly uniform vehicle interior material can be readily produced.

Furthermore, in the case where the hot-pressing is carried out at a temperature ranging from a temperature higher than the melting temperature of the thermoplastic resin fiber or powder by 5° C., to a temperature higher than the melting temperature of the thermoplastic resin fiber or powder by 50° C., but a temperature ranging from the thermal expansion starting temperature of the thermally expandable microcapsule, to a temperature lower than the thermal expansion starting temperature of the thermally expandable microcapsule by 50° C., a thermally expandable base material for vehicle interior can be produced in which the inorganic fibers are partly bound with a thermoplastic resin to be reinforced and the handling after the production is easy.

In the case where the thermoplastic resin fiber is a polyolefin resin fiber, and in the case where the thermoplastic resin powder is a polyolefin resin powder, they are melted at a relatively low temperature to readily bind the inorganic fibers, whereby thermally expandable base materials for vehicle interior for readily reinforcing a fiber mat from the inside can be readily produced.

Further, in the case where the inorganic fiber, the thermoplastic resin fiber and the thermally expandable microcapsule are used in amounts of, respectively 20% to 80% by weight, 20% to 80% by weight, and 5% to 20% by weight, based on 100% by weight of the total of the inorganic fiber and the thermoplastic resin fiber, and in the case where the inorganic fiber, the thermoplastic resin powder and the thermally expandable microcapsule are used in amounts of, respectively 20% to 80% by weight, 20% to 80% by weight, and 5% to 20% by weight, based on 100% by weight of the total of the inorganic fiber and the thermoplastic resin powder, thermally expandable base materials for vehicle interior having high strength can be readily produced. When the base materials are used, vehicle interior materials can be readily obtained which have good formability and high strength, and are moderately expanded.

Additionally, in the case where the thermally expandable microcapsule are distributed after static electricity removal, the thermally expandable microcapsule is uniformly distributed over the first web without causing flocculation, whereby a thermally expandable base material for vehicle interior allowing the production of a highly uniform vehicle interior material can be readily produced.

Furthermore, in the case where the inorganic fiber is a glass fiber, a thermally expandable base material for vehicle interior allowing the production of a vehicle interior material having sufficient insulation and sound-absorbing properties can be readily produced at a low cost. Therefore, the glass fiber achieves cost effectiveness and is readily available.

According to the method of the embodiment of the present invention for producing a base material for vehicle interior, when the thermally expandable base material for vehicle interior obtained by the one aspect of the embodiment of the present invention, or the thermally expandable base material for vehicle interior obtained by the another aspect of the embodiment of the present invention is subjected to simple operations or processes including heating at a temperature higher than the thermal expansion starting temperature of the thermally expandable microcapsule, a thermally expandable base material for vehicle interior allowing the production of a vehicle interior material which is lightweight, sufficiently sound absorbable and highly rigid can be readily produced.

In addition, in the case where the heating is carried out at a temperature ranging from a temperature higher than the thermal expansion starting temperature of the thermally expandable microcapsule by 5° C., to a temperature higher than the thermal expansion starting temperature of the thermally expandable microcapsule by 50° C., a base material for vehicle interior which is moderately expanded and is sufficiently lightweight can be readily produced.

The embodiment of the present invention is applicable to the technical fields of a thermally expandable base material for vehicle interior which allowing the production of a vehicle interior material which is lightweight, sufficiently sound absorbable and highly rigid, and of a base material for vehicle interior using the thermally expandable base material for vehicle interior. In particular, the embodiment of the present invention is useful for a product such as a ceiling material for vehicle; a door trim; a trunk room lining; a product in a trunk room of a station wagon; and the like.

Obviously, numerous modifications and variations of the present invention are possible in light of the above teachings. It is therefore to be understood that within the scope of the appended claims, the invention may be practiced otherwise than as specifically described herein.

What is claimed is:

1. A method for producing a thermally expandable base material for a vehicle interior, the method comprising:
   needling a web to produce a fiber mat, the web comprising an inorganic fiber, a thermoplastic resin fiber, and a thermally expandable microcapsule;
   heating said fiber mat to a temperature at which said thermoplastic resin fiber is melted and which is lower than a thermal expansion starting temperature of said thermally expandable microcapsule;
   hot-pressing said fiber mat; and
   cooling said fiber mat.

2. The method for producing a thermally expandable base material for a vehicle interior according to claim 1,
   wherein said web is fabricated by forming a first web comprising said inorganic fiber and said thermoplastic resin fiber, distributing said thermally expandable microcapsule over said first web, and then laminating a second web comprising said inorganic fiber and said thermoplastic resin fiber to said first web on a side having said thermally expandable capsule.

3. The method for producing a thermally expandable base material for a vehicle interior according to claim 1,
   wherein said hot-pressing is carried out at a temperature ranging from a temperature higher than the melting temperature of said thermoplastic resin fiber by 5° C., to a temperature higher than the melting temperature of said thermoplastic resin fiber by 50° C., but a temperature ranging from said thermal expansion starting temperature of said thermally expandable microcapsule, to a temperature lower than said thermal expansion starting temperature of said thermally expandable microcapsule by 50° C.

4. The method for producing a thermally expandable base material for a vehicle interior according to claim 1,
   wherein said thermoplastic resin fiber is a polyolefin resin fiber.

5. The method for producing a thermally expandable base material for a vehicle interior according to claim 1,
   wherein said inorganic fiber, said thermoplastic resin fiber and said thermally expandable microcapsule are used in amounts of, respectively 20% to 80% by weight, 20% to 80% by weight, and 5% to 20% by weight, based on 100% by weight of the total of said inorganic fiber and said thermoplastic resin fiber.

6. A method for producing a thermally expandable base material for a vehicle interior, the method comprising:
   needling a web to produce a fiber mat, the web comprising an inorganic fiber, a thermoplastic resin powder, and a thermally expandable microcapsule;
   heating said fiber mat to a temperature at which said thermoplastic resin powder is melted and which is lower than a thermal expansion starting temperature of said thermally expandable microcapsule;
   hot-pressing said fiber mat; and
   cooling said fiber mat.

7. The method for producing a thermally expandable base material for a vehicle interior according to claim 6,
   wherein said web is fabricated by forming a first web comprising said inorganic fiber, distributing said thermoplastic resin powder and said thermally expandable microcapsule over said first web, and then laminating a second web comprising said inorganic fiber to said first web on a side having said thermoplastic resin powder and said thermally expandable capsule.

8. The method for producing a thermally expandable base material for a vehicle interior according to claim 6,
   wherein said hot-pressing is carried out at a temperature ranging from a temperature higher than the melting temperature of said thermoplastic resin powder by 5° C., to a temperature higher than the melting temperature of said thermoplastic resin powder by 50° C., but a temperature ranging from said thermal expansion starting temperature of said thermally expandable microcapsule, to a temperature lower than said thermal expansion starting temperature of said thermally expandable microcapsule by 50° C.

9. The method for producing a thermally expandable base material for a vehicle interior according to claim 6, wherein said thermoplastic resin powder is a polyolefin resin powder.

10. The method for producing a thermally expandable base material for a vehicle interior according to claim 6,
wherein said inorganic fiber, said thermoplastic resin powder and said thermally expandable microcapsule are used in amounts of, respectively 20% to 80% by weight, 20% to 80% by weight, and 5% to 20% by weight, based on 100% by weight of the total of said inorganic fiber and said thermoplastic resin powder.

11. The method for producing a thermally expandable base material for a vehicle interior according to claim 1,
wherein said thermally expandable microcapsule are distributed after static electricity removal.

12. The method for producing a thermally expandable base material for a vehicle interior according to claim 1,
wherein said inorganic fiber is a glass fiber.

* * * * *